May 5, 1931.   C. L. SHERBURNE   1,803,360
DUMP BODY FOR TRUCKS
Filed May 3, 1929   2 Sheets-Sheet 2
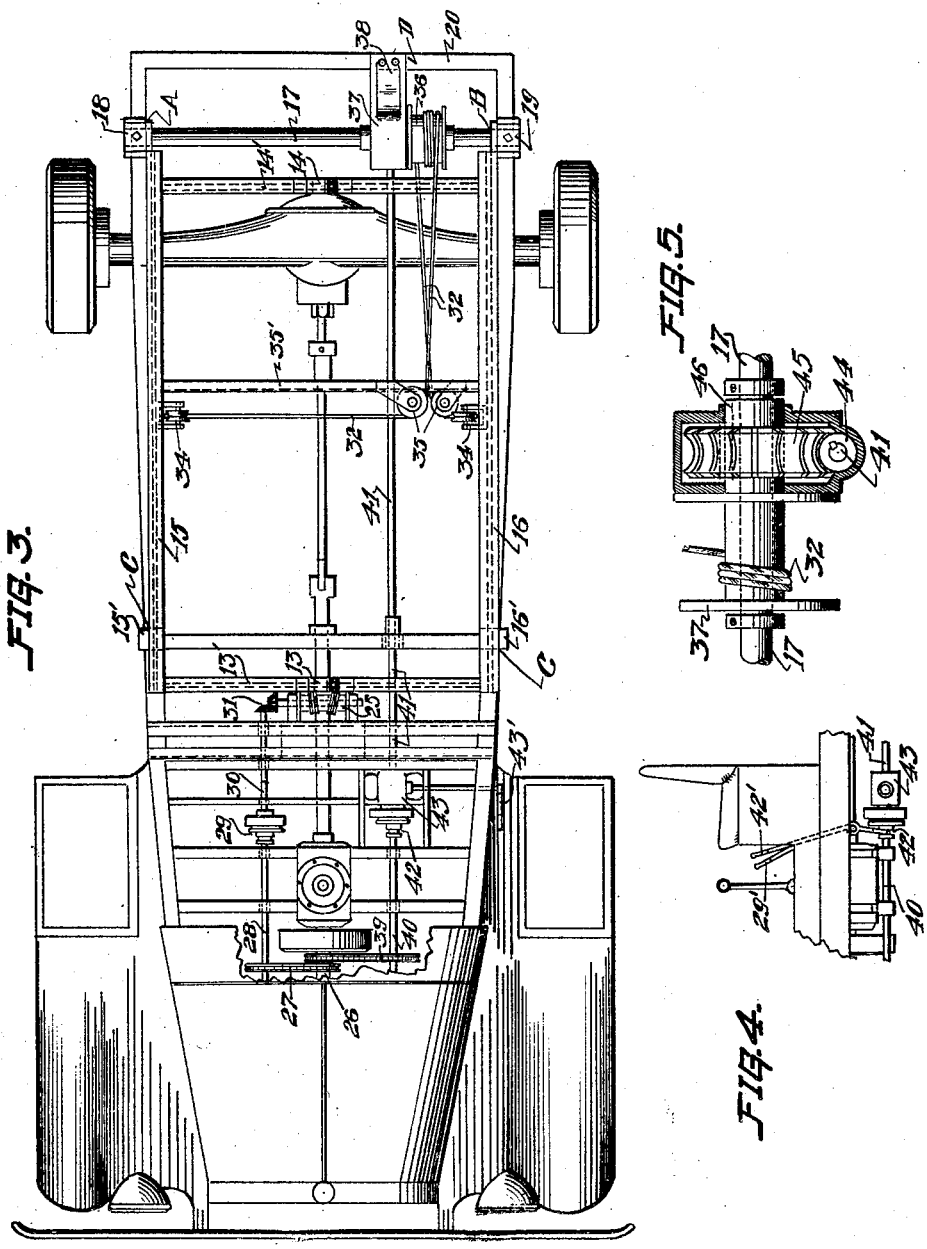
INVENTOR.
Claude L. Sherburne
BY U. G. Charles
Byron S. Cohn
ATTORNEY.

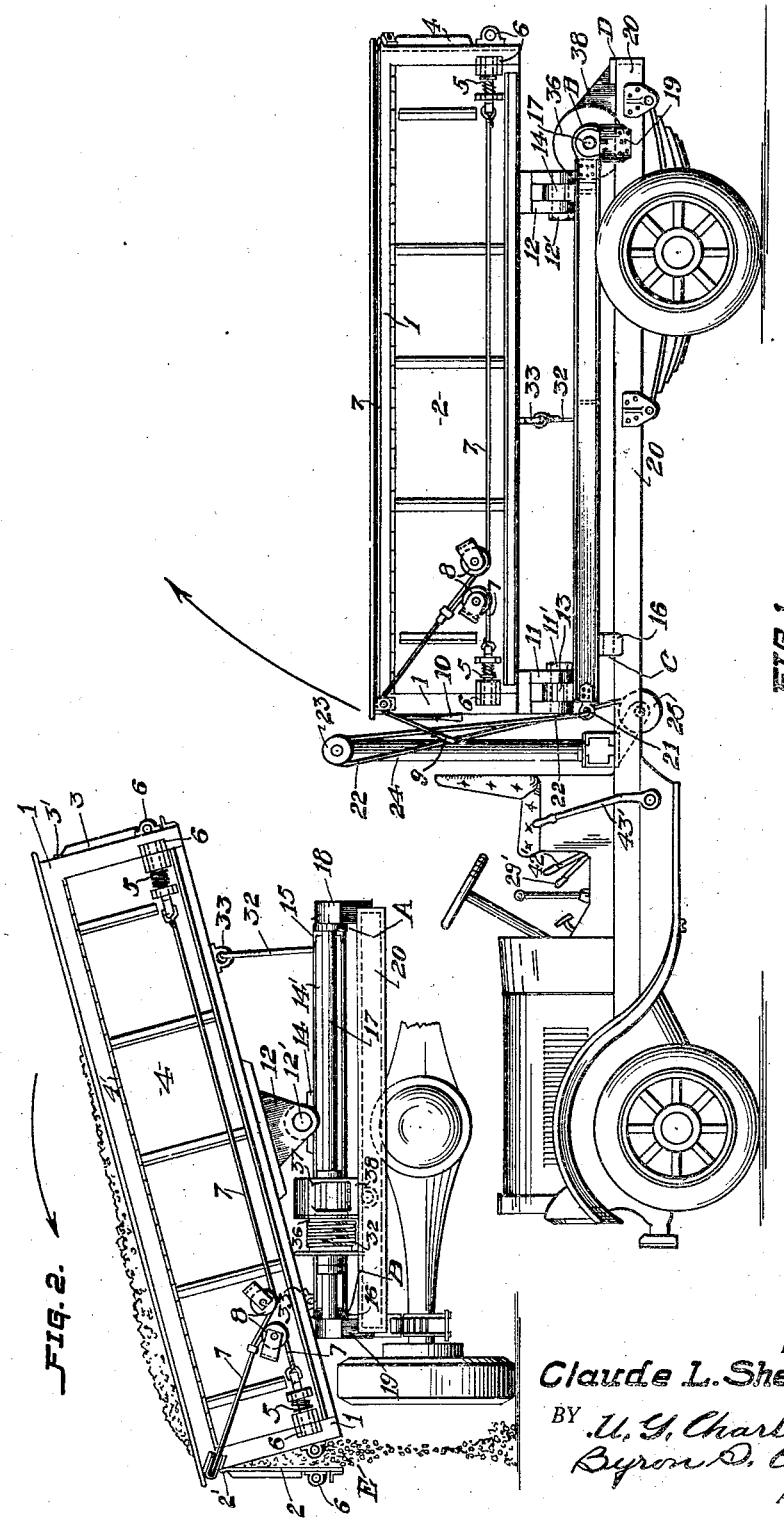

Patented May 5, 1931

1,803,360

UNITED STATES PATENT OFFICE

CLAUDE L. SHERBURNE, OF TOPEKA, KANSAS, ASSIGNOR OF ONE-THIRD TO ORSON F. BAKER, OF INDEPENDENCE, KANSAS, AND ONE-THIRD TO PRESTON UPDIKE, OF FORT SCOTT, KANSAS

DUMP BODY FOR TRUCKS

Application filed May 3, 1929. Serial No. 360,118.

My invention relates to improvements in dump bodies for trucks.

The object of my invention is to provide a dump body assembly for trucks arranged to discharge the contents of the body to either side or to the rear of the truck as desired.

Another object of my invention is to provide a dump body assembly for trucks arranged to dump the contents of the body to either side or the rear of the truck whether the truck is stationary or in motion.

A still further object of my invention is to provide a dump body assembly arranged to be adapted to the frame of a standard truck with a means to tilt the body to the left or right side of the truck and another means to tilt the body toward the rear of the truck and the first said means being operable during the operation of the second said means when the material is being discharged to the rear of the truck.

A still further object of my invention is to provide a body assembly of the kind described comprising a steel body pivotally mounted on a frame and rockable to the right or left side of the truck and the said frame being pivotally mounted at the rear end of the truck chassis to permit the rocking of the body in that direction for the discharge of the contents to the rear of the truck.

A still further object of my invention is to provide a dump body assembly of the kind described having a winch driven by the engine of the truck and the drum of the winch carrying a cable, the ends of which are attached to the lower portion of the dump body. The winch being connected to the engine drive by a clutch and reverse gear to actuate the working of the dump body on its pivots and the drive being a worm and gear engagement to prevent rotation of the winch except by the truck engine.

A still further object of my invention is to provide a winch mounted at the pivotal point of the body frame of a dump truck assembly so that the function of the winch with regard to the rockable body on the said frame is not changed by the position of the frame.

These and other objects will be hereinafter more fully explained.

Referring to the drawings:

Fig. 1 is a side elevation of the dump body assembly mounted on a truck chassis.

Fig. 2 is a fragmentary rear end view of Fig. 1 illustrating the body tilted to the left side of the truck in the action of discharging its contents.

Fig. 3 is a plan view of the truck chassis with parts broken away for illustrative purposes and the dump body removed from the frame.

Fig. 4 is a fragmentary elevation illustrating the method of lever control of the clutch mechanism on the drive for one of the winches.

Fig. 5 is an elevation of the winch positioned on the shaft of the dump body frame with the case or housing shown in section.

A rectangular box-like body 1 is equipped with hinged doors 2 and 3 on its sides and 4 at the back hingedly connected to the frame of the box at the points 2', 3', and 4' respectively. Each of the doors is held in position by the latch mechanism 5 in engagement with the detents 6. The latch mechanisms are arranged to be released by means of the cables 7 guided by the pulleys 8 as shown, to the front of the box. The pulls 9 and 10 are placed convenient to the reach of the truck driver. The pull 9 operates the latches on the side door 2, the pull 10 operates the latches on the rear door 4, another pull not shown in the drawing operates similar latches on the side door 3. Firmly affixed to the bottom of the box and positioned as shown are the members 11 and 12, the same being pin connected by means of the pins 11' and 12' respectively, to the bearings 13 and 14. The bearing 13 carries the member 11, the bearing 14 carries the member 12. These bearings are in turn carried by the cross bars 13' and 14' respectively, the latter forming an integral part, with the members 15 and 16, of a rectangular frame comprised of I-beams. One end of the frame is pivotally carried on the shaft 17 as shown at A and B. The shaft 17 is rigidly positioned in the supports 18 and 19 both of which are affixed to the frame of the truck 20. The leg members 15' and 16' affixed to the members 15 and 16 space the frame, comprising the members 15, 16, 13' and 14', away from the truck frame 20 as shown at C. Eyes 21 are positioned on the front end of the members 15 and 16 as shown, to which are connected the ends of the cables 22. The cables 22 pass over the sheaves 23 at the upper point of the post 24 and to the drum 25. The latter is rotatable from the torque of the engine shaft 26 delivered through the chain drive 27, to the shaft 28 and thence through the clutch 29 to the shaft 30, which drives the bevel gear engagement at 31. When the engine is running the engagement of the clutch at 29 results in the rotation of the drum 25 thereby raising the end of the frame in the direction of the arrow as indicated in Fig. 1. This tilts the box toward the rear of the truck and when the operator of the truck releases the latch mechanisms 5 on the door 4 by operating the pull 10, the contents of the box will be discharged. This can be accomplished when the truck is in motion or stationary. The lever 29', accessible to the driver, functions to operate the clutch 29.

The box is pivoted on an axis longitudinal to the truck on the bearings 13 and 14 as heretofore described and is rockable to the left or right side of the truck in a manner illustrated in Fig. 2. This is accomplished by means of the cables 32 shown connected to the eyes 33, the latter firmly affixed to the bottom of the box in the manner shown. The cables 32 pass down over pulleys 34 affixed to the I-beams 15 and 16, thence over the pulleys 35, positioned on the auxiliary channel 35', the same being carried at either end on the I-beams 15 and 16, and thence to the drum 36 of the winch 37. The winch 37 and its component parts are carried on the shaft 17. The housing of the winch is prevented from rotation by the brace 38 fastened to the frame 20 at D. Whenever the drum 36 is rotated one of the cables will be taken up and the other paid out thus tipping the box as shown.

Power is applied to the winch through the chain drive from the motor shaft 26 to the shaft 40 the same being connected to the shaft 41 through the clutch 42 and the reversing gear assembly 43. The shaft 41 terminates in the housing of the winch and has, firmly affixed on its end and trunnioned in the winch, the worm 44, the latter being in mesh with a worm gear 45 firmly affixed to the sleeve member 46. The sleeve member comprises the spool of the drum and is rotatable upon the shaft 17 as illustrated in Fig. 5. The lever 42' controls the clutch 42 and the lever 43' controls the reverse gear 43.

It can be readily seen that whenever the clutch 42 is in engagement, rotation of the drum 36 ensues. The direction of the rotation depending upon the selection of the gear in the reversing mechanism 43. The pitch of engagement of the gears 44 and 45 is such as to prevent rotation of the drum 36 except by the shaft 41. Therefore the position of the box cannot be changed except by rotation of the shaft 41. The pull 9 releases the latches on the side 2 and discharge of the contents of the box ensues as illustrated in Fig. 2 at E. By the arrangement of the winch 37 heretofore described the box may be rocked toward either side of the truck whether the frame is in position as shown in Fig. 1 or lifted to discharge the load to the rear of the truck.

Various means of driving the winch 37 and drum 25 may be used. However, the arrangement of the frame and the location of the winch thereon at the pivot point of the frame are pertinent to the successful function of the dump body.

The advantage of my invention over the dump body mechanisms now in use lies in its features of dumping the load to either side of the truck or to the rear as desired. The body may be rocked from side to side whether the frame is tilted to the rear or resting on the members of the truck chassis as illustrated.

The use of a winch mechanism to dump a truck body to the rear is not claimed as new but the arrangement of the truck box to dump to either side of the truck and to the rear and to rock the box to either side of the truck when it is in position to dump to the rear is the principle of my invention and what I claim as new and desire to secure by Letters Patent is:

1. In dump bodies for trucks for the discharge of load to the sides or rear of the truck, a dump body and a frame, the dump body pivotally mounted on the frame on an axis longitudinal with the truck and the frame pivotally mounted at the rear of the chassis of the truck and carried by the chassis of the truck, a winch and cable means to raise the said frame to tilt the body to the rear of the truck and another winch mounted at the pivot axis of the said frame and connected by a cable to the said body as a means to tilt the body to either side of the truck.

2. In a mechanism to discharge the contents of a truck body to either side of the truck or to the rear, a rectangular frame, supports on the said frame, the said frame pivotally connected at one end to the chassis of the truck and capable of being raised at the other end by a winch and cable system, a box pivotally mounted on the said supports, another system of cables connected to the under side of the said box and passing over the drum of another winch, the last said winch positioned at the pivotal axis of the said frame, the first said winch receiving power from the truck engine through a friction clutch and the last said winch receiving power from the truck engine through a friction clutch and a reversing gear and the component parts of the last said winch comprising a drum, a worm gear and a worm substantially as shown.

In testimony whereof I affix my signature.

CLAUDE L. SHERBURNE.